United States Patent [19]

Nagai et al.

[11] Patent Number: 4,814,388
[45] Date of Patent: Mar. 21, 1989

[54] RUBBER-MODIFIED THERMOPLASTIC RESIN COMPOSITION

[75] Inventors: Hisao Nagai, Yokkaichi; Yuzi Nakagawa, Kuwana; Katsurou Oomura, Kameyama; Shinichi Kimura, Yokkaichi, all of Japan

[73] Assignee: Japan Synthetic Rubber Co., Ltd., Tokyo, Japan

[21] Appl. No.: 829,075

[22] Filed: Feb. 13, 1986

[30] Foreign Application Priority Data

Mar. 2, 1985 [JP] Japan .................................. 60-41703

[51] Int. Cl.$^4$ ..................... C08F 255/04; C08F 255/06
[52] U.S. Cl. ..................................... 525/322; 525/289; 525/290; 525/316; 525/324
[58] Field of Search ............... 525/290, 322, 324, 289, 525/316

[56] References Cited

U.S. PATENT DOCUMENTS

| | | | |
|---|---|---|---|
| 3,819,765 | 6/1974 | O'Shea | 525/290 |
| 3,984,496 | 10/1976 | Morimoto et al. | 525/322 |
| 4,490,508 | 12/1984 | Nagano et al. | 525/322 |
| 4,659,785 | 4/1987 | Nagano et al. | 525/322 |

FOREIGN PATENT DOCUMENTS

| | | | |
|---|---|---|---|
| 706455 | 3/1965 | Canada | 525/316 |
| 0131241 | 8/1982 | Japan | 525/289 |

*Primary Examiner*—Wilbert J. Briggs, Sr.
*Attorney, Agent, or Firm*—Oblon, Fisher, Spivak, McClelland & Maier

[57] ABSTRACT

A rubber-modified thermoplastic resin composition obtained by copolymerizing an aromatic vinyl compound and optionally other monomers copolymerizable therewith in the presence of an ethylene-α-olefin type rubbery polymer having a molecular weight distribution parameter Mw/Mn of 1.2 to 4.5. Said polymer preferably has Mooney viscosity ($ML_{1+4}$, 100° C.) of 40 or less. Said composition is excellent not only in weather resistance and impact resistance but also in rigidity, surface gloss and molded product appearance.

9 Claims, No Drawings

RUBBER-MODIFIED THERMOPLASTIC RESIN COMPOSITION

This invention relates to a thermoplastic resin composition having excellent weather resistance and impact resistance which is obtained by graft-copolymerizing vinyl monomers such as styrene, acrylonitrile and the like in the presence of an ethylene-α-olefin type rubbery polymer such as an ethylene-propylene copolymer (EPR), an ethylene-propylene-non-conjugated diene copolymer (EPDM) or the like.

It is known that graft copolymers obtained by grafting styrene, acrylonitrle and the like on a rubber component (EPR or EPDM) having substantially no unsaturated bond in the main chain, namely, AES resins have greater resistance to ultraviolet rays, oxygen and ozone and much better weather resistance than ABS resins obtained by grafting these monomers on a diene type rubber. As in other rubber-modified thermoplastic resins, the impact strength of AES resins can be enhanced either by increasing the amount of rubber component (but this causes reduction in rigidity) or by increasing the molecular weight of hard resin component (but this causes reduction in workability). Thus, the simultaneous improvement in impact strength, rigidity and workability of AES resins has been difficult.

In order for AES resins to fully exhibit functions as a rubber-modified resin, it is also necessary that the compatibility between the rubber component of disperse phase and the hard resin component of continuous phase be enhanced by a graft reaction of vinyl monomers on rubber. However, this grafting is not sufficient when conducted according to conventional processes and no AES resins of good quality have been obtainable.

That is, the compatibility of EPR or EPDM with styrene-acrylonitrile copolymers is, as well known, inferior to the compatibility of diene type rubber with the same copolymers. Therefore, AES resins, as compared with ABS resins, have tended to show a low impact resistance, laminar separation (a phenomenon wheren rubber particles and a matrix resin separate from each other) and poor molded product appearance (pearl-like appearance). Hence, when an EPR or EPDM is used as the rubber component of AES resins, a larger amount of grafting components are required in order to ensure satisfactory quality.

However, the EPR or EPDM has substantially no unsaturated bond in the main chain and too small number of unsaturated bonds in the side chains to be compared with diene type rubbers. This prevents the increase of efficiency of graft reaction of vinyl monomers on EPR or EPDM. Thus, a double handicap has existed in production of AES resins.

The present inventors have conducted extensive study in order to solve the above drawbacks of AES resins and, as a result, succeeded in obtaining an AES resin having an excellent impact strength and rigidity by using, as a rubber component, an EPR or EPDM having a particular molecular weight distribution. The present inventors have further succeeded in obtaining an AES resin excellent not only in impact strength and rigidity but also in surface gloss and molded product appearance.

According to this invention, there is provided a thermoplastic resin composition obtained by copolymerizing vinyl monomers such as styrene, acrylonitrile and the like in the presence of an ethylene-α-monoolefin type rubbery polymer (EPR or EPDM) having a molecular weight distribution parameter [weight average molecular weight (Mw)/number average molecular weight (Mn)] of 1.2 to 4.5.

The ethylene-α-monoolefin type rubbery polymer used in the present invention includes EPRs and EPDMs as typical examples. EPRs are copolymers of ethylene and propylene and EPDMs are copolymers of ethylene, propylene and a non-conjugated diene. These rubbery polymers have a Mw/Mn ratio of 1.2 to 4.5, preferably 1.5 to 4, more preferably 1.8 to 4. The EPDMs preferably have an unsaturation degree of 4 to 40 in terms of iodine value. The diene component used in the EPDMs includes alkenylnorbornenes, cyclic dienes and aliphatic dienes, and prefered are 5-ethylidene-2-norbornene and dicyclopentadiene.

When the Mw/Mn ratio exceeds 4.5, a desired rigity cannot be obtained. Meanwhile, an ethylene-α-monoolefin type rubbery polymer having a Mw/Mn ratio of less than 1.2 is difficult to produce. The ethylene-α-monoolefin type rubbery polymer has preferably a Mooney viscosity ($ML_{1+4}$, 100° C.) of 40 or less, more preferably 5 to 30, because thermoplastic resins produced from such a rubbery polymer are excellent in molded product appearance and gloss. The ethylene-α-monoolefin type rubbery polymer has preferably an ethylene/α-monoolefin weight ratio of 90/10 to 60/40, more preferably 90/10 to 65/35, and most preferably 88/12 to 70/30, because thermoplastic resins produced from such a rubbery polymer are excellent in solvent resistance and weather resistance.

When the ethylene-α-monoolefin type rubbery polymer has both the above Mooney viscosity and the above ethylene/α-monoolefin weight ratio, rubber-modified thermoplastic resin compositions produced from such a rubbery polymer have double effects derived from said viscosity and said composition ratio.

In general, a higher iodine value gives a higher grafting degree. In this invention, however, a sufficiently high grafting degree can be obtained with a rubbery polymer of low iodine value or an EPR and accordingly AES resins having excellent weather resistance can be obtained with such a rubbery polyemr or an EPR. This is one of the advantages of this invention.

The rubber-modified thermoplastic resin composition of this invention can be produced by various processes for radical-polymerizing a vinyl monomer in the presence of the above-mentioned rubbery polymer, and an emulsion polymerization process, a bulk polymerization process, a suspension polymerization process, a solution polymerization process or the like can be used as said process.

The vinyl monomer used in this invention may be an aromatic vinyl compound alone or, if necessary, a combination of said aromatic vinyl compound with other monomers copolymerizable therewith such as a vinyl cyanide compound and the like.

Rubber-modified thermoplastic resin compositions produced by using, as the vinyl monomer, a mixture consisting mainly of an aromatic vinyl compound and a vinyl cyanide compound are preferable, because they are superior to those produced by using a vinyl monomer without any vinyl cyanide compound in chemicals resistance, and moreover, when coating molded articles produced therefrom, such unfavorable phenomena as uneven coating, cracking, low adhesion and the like are hardly caused.

The aromatic vinyl compound includes styrene, α-methylstyrene, vinyltoluene, vinylxylene, monochlorostyrene, dichlorostyrene, monobromostyrene, dibromostyrene, fluorostyrene, p-tert-butylstyrene, ethylstyrene, vinylnaphthalene, etc. They can be used alone or in combination of two or more. A preferable aromatic vinyl compound is styrene or a mixture containing at least 50% by weight of styrene.

The vinyl cyanide compound includes acrylonitrile, methacrylonitrile, etc. They can be used alone or in admixture of two or more. Acrylonitrile is particularly preferable.

Said other monomers copolymerizable with the aromatic vinyl monomer includes alkyl, cycloalkyl, aryl and aralkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, benzyl acrylate and the like; alkyl, cycloalkyl, aryl and aralkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, benzyl methacrylate and the like; unsaturated acid anhydrides such as maleic anhydride, itaconic anhydride, citraconic anhydride and the like; unsaturated acids such as acrylic acid, methacrylic acid and the like; and so forth. These compounds can be used alone or in combination of two or more unless it causes any inconvenience to the rubber-modified thermoplastic resin composition intended by this invention.

When the monomer component used is a combination of an aromatic vinyl compound and a vinyl cyanide compound, the weight ratio of aromatic vinyl compound to vinyl cyanide compound is preferably 30-90/70-2, more preferably 60-95/40-5.

The content of rubbery polymer in AES resin can be selected appropriately so as to satisfy the intended purpose but, in order for the AES resin to have a sufficient impact resistance for practical use, it is preferably 5 to 45% by weight, more preferably 10 to 40% by weight.

In this invention, a preferable monomer is an aromatic vinyl compound or a combination of said aromatic vinyl compound and a vinyl cyanide compound. Specific examples of the preferable monomer or monomers are shown below.

(1) Styrene
(2) Styrene-methyl methacrylate
(3) Styrene-acrylonitrile
(4) Styrene-acrylonitrile-methyl methacrylate Replacement of a part or the whole of styrene with α-methylstyrene can impart heat resistance. Replacement of a part or the whole of styrene with a halogenated styrene can impart flame retardancy. The use of methyl methacrylate in the above monomer combinations serves to enhance the transparency of rubber-modified thermoplastic resin composition and can impart excellent colorability to said resin.

The rubber-modified thermoplastic resin composition of this invention can be blended with other polymers suitable for purposes such as a rubbery polymer, a thermoplastic elastomer, a thermoplastic resin and the like. Specific examples of said other polymers include a polyvinyl chloride, a polyphenylene ether, a polycarbonate, a polyethylene terephthalate, a polybutylene terephthalate, a polyacetal, a polyamide, a polyvinylidene fluoride, a polystyrene, a high impact polystyrene, a styrene-acrylonitrile copolymer, an ABS resin, another AES resin, a styrene-methyl methacrylate copolymer, a styrene-maleic anhydride copolymer, a chlorinated polyethylene, an EPR, an EPDM, a 1,2-polybutadiene, etc. These can be used alone or in admixture of two or more.

Next, this invention will be explained specifically referring to Examples. However, these Examples are by way of illustration only and not by way of restriction.

Production of EPRs and EPDMs

I. Rubbery Polymer No. 1

Ethylene and propylene were continuously copolymerized in a 200-liter autoclave reactor at a temperature of 35° C. and a pressure of 7.5 kg/cm$^2$ while the mole ratio of ethylene to propylene in the gas phase was kept at 1.0, and the concentration of hydrogen in the gas phase was kept at 10 mole %, after which n-hexane was supplied at a rate of 80 liters per hour, and ethylaluminum sesquichloride and vanadium oxytrichloride were supplied as polymerization catalyst at rates of $5.8 \times 10^{-3}$ and $2.9 \times 10^{-4}$ mole per liter of hexane, respectively.

To the reaction mixture taken out of the reactor was added a small amount of water as reaction stopper, after which the solvent was taken out of the system by means of steam distillation. The rubber obtained was dried in a finish step to obtain Rubbery Polymer No. 1 having the characteristics shown in Table 1.

II. Rubbery Polymer Nos. 2 to 9

The procedure used for the production of Rubbery Polymer No. 1 was repeated, except that the ratio of ethylene to propylene, the catalyst amount, the supplying rates of 5-ethylidene-2-norborene and dicyclopentadiene, the hydrogen-supplying rate, the polymerization temperature and the polymerization pressure were altered, whereby Rubbery Polymer Nos. 2 to 9 each having the characteristics shown in Table 1 were obtained.

Production of AES resins

Example 1

Into a 10-liter autoclave reactor were fed the following materials:

| | |
|---|---|
| Rubbery Polymer No. 1 | 20 parts by weight |
| Styrene | 56 parts by weight |
| Acrylonitrile | 24 parts by weight |
| Toluene | 100 parts by weight |

They were stirred at 50° C. until a complete solution was obtained. Thereto were added the following compounds:

| | |
|---|---|
| tert-Dodecylmercaptan | 0.3 part by weight |
| tert-Butyl peroxybenzoate | 0.5 part by weight |

The resulting mixture was subjected to polymerization reaction at 100° C. for 10 hours.

The solvent was removed according to a conventional method. The product was dried. Thereto was added 0.4 part by weight of 2,2'-methylene-bis(4-ethyl6-tert-butylphenol). The resulting mixture was pelletized by means of a 40-mmφ extruder kept at 200° C. The pellets obtained were formed into test pieces using a 50 Z injection machine kept at 230° C. The test pieces were used for measurement of physical properties. The results obtained are shown in Table 1.

EXAMPLES 2 TO 6 AND COMPARATIVE EXAMPLES 1 TO 3

The procedure of Example 1 was repeated, except that the rubbery polymer was altered, whereby 8 different AES resins were obtained. In the same procedure as in Example 1, these resins were formed into respective test pieces and measured for physical properties. The results obtained are shown in Table 1.

(4) Gloss

Test method: JIS Z 8741 (reflectance at an incident angle of 45°)

(5) Appearance

Test method: Visual check
Evaluation:
Good: Free from any part having a pearl-like appearance.
Poor: A pearl-like appearance is clearly observed.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Rubbery polymer No. | 1 | 2 | 3 | 4 | 5 | 6 | 7 | 8 | 9 |
| Mw/Mn | 2.8 | 2.1 | 2.1 | 2.8 | 3.2 | 3.9 | 5.1 | 4.7 | 4.7 |
| Non-conjugated diene | — | — | — | ENB | ENB | DCP | — | ENB | ENB |
| Iodine value | — | — | — | 10 | 10 | 10 | — | 10 | 10 |
| Propylene content, % by weight | 40 | 29 | 25 | 35 | 35 | 35 | 40 | 45 | 35 |
| $ML_{1+4}$, 100° C. | 35 | 30 | 20 | 35 | 35 | 35 | 35 | 35 | 45 |
| AES resin | | | | | | | | | |
| Koka type flow value, × $10^{-3}$ cc/sec | 12 | 11 | 12 | 12 | 10 | 10 | 12 | 11 | 10 |
| Izod impact strength, kg · cm/cm | 36 | 38 | 32 | 42 | 46 | 42 | 21 | 37 | 35 |
| Rockwell hardness, R scale | 100 | 101 | 102 | 99 | 98 | 98 | 93 | 92 | 88 |
| Tensile strength, kg/cm$^2$ | 425 | 430 | 440 | 420 | 410 | 405 | 385 | 370 | 350 |
| Weather resistance, 0 hr | >100 | >100 | >100 | >100 | >100 | >100 | >100 | >100 | >100 |
| kg · cm/cm      400 hr | >100 | 95 | 90 | >100 | >100 | >100 | >100 | 65 | >100 |
| Kerosene resistance | Good | Good | Good | Good | Good | Good | Good | Poor | Good |
| Gloss, % | 80 | 82 | 84 | 78 | 72 | 75 | 80 | 75 | 65 |
| Appearance | Good | Good | Good | Good | Good | Good | Good | Good | Poor |

Note
ENB: Ethylidenenorbonene
DCP: Dicyclopentadiene
Koka type flow value: A flow rate through a 1 φ × 2L mm nozzle at 30 kg/cm$^2$ and 100° C.
Izod impact strength: ASTM D 256
Rockwell hardness: ASTM D 785
Tensile strength: ASTM D 638

In Table 1, the measurement of each of the characteristics was conducted as follows:

(1) Izod impact strength

Test method: ASTM D 256 (a cross-section of ¼ inch × ½ inch, notched)

(2) Weather resistance

Test conditions: Sunshine weatherometer (WEL-6 x S-DC, manufactured by Suga Shikenki K.K.)
Black panel temperature: 63±3° C.
Humidity inside the chamber: 60±5% RH
Rainfall cycle: 18/120 minutes
Carbon change cycle: 60 hours
Test method: ASTM D 256 (a cross-section of 1/8 inch × ½ inch, unnotched, −30° C.)

(3) Kerosene resistance

Test method: A molded article from black pellets composed of 100 parts by weight of a resin, 70.5 parts by weight of carbon black and 0.3 part by weight of calcium stearate was immersed in JIS No. 6 kerosene at 50° C. for 1 hour. Then, the surface of the article was wiped off and dried to observe any change.
Evaluation:
Good: No discoloration is observed.
Poor: Change is observed in whitening, reduction in gloss, etc.

Measurement of Mw/Mn in Table 1

Mw/Mn was measured as follows, in accordance with the method described in "Gel Permeation Chromatography" by Takeuchi published by Maruzen K.K.:

(1) Using standard polystyrenes (monodisperse polystyrenes manufactured by TOYO SODA MFG. CO., LTD.) whose molecular weights were known, their molecular weights and gel permeation chromatography (GPC) counts were measured. Using these data, a calibration curve regarding the correlation between molecular weight (M) and elution volume (EV) was prepared. A concentration of 0.02% by weight was used.

The above calibration curve by standard polystyrenes was corrected to a calibration curve for EPDMs, according to the universal method.

(2) The GPC pattern of a sample was measured according to the GPC method and applied to the above calibration curve for EPDMs, whereby the M of the sample was obtained. In this case, the sample preparation was made as follows and the GPC measurement conditions were as follows:

Sample preparation (a) 2,6-Di-tert-butyl-p-cresol (antioxidant) was dissolved in o-dichlorobenzene (solvent) in a proportion of 0.08% by weight.

(b) A sample and the above solvent were placed in an Erlenmeyer flask so that the sample concentration became 0.1% by weight.

(c) The flask was heated to 120° C. and stirred for about 60 minutes for dissolution.

(d) The resulting solution was subjected to gel permeation chromatography. In the GPC apparatus, the solution was automatically filtered through a 0.5μ sintered filter.

GPC measurement conditions (a) Apparatus: Model 150 C, manufactured by Waters
(b) Column: H type, manufactured by TOYO SODA MFG. CO., LTD.
(c) Sample amount: 500 μl
(d) Temperature: 120° C.
(e) Flow rate: 1 ml/min
(f) Number of total theoretical plates in column: $1 \times 10^4$ to $2 \times 10^4$ (measured with acetone)

As seen in Examples 1 to 6, AES resins using a rubbery polymer (EP or EPDM) having a Mw/Mn of 1.2 to 4.5 are high in impact strength, hardness and rigidity. They are also excellent in surface gloss, molded product appearance, solvent resistance and weather resistance.

On the other hand, as seen in Comparative Examples 1 to 3, AES resins using a rubbery polymer (EPR or EPDM) having a Mw/Mn of more than 4.5 are low in impact strength and very low in hardness and rigidity. The AES rsin of Comparative Example 2 using a rubbery polymer component whose propylene content is higher than the specified range of this invention is extremely inferior in weather resistance and kerosene resistance. The AES resin of Comparative Example 3 using a rubbery polymer component whose Mooney viscosity is higher than the specified range of this invention is low in surface gloss and poor in apperance (clearly gives a pearl-like appearance).

What is claimed is:

1. A rubber-modified thermoplastic resin composition obtained by copolymerizing a monomer mixture consisting essentially of styrene and acrylonitrile in a weight ratio of 60–95/40–5, respectively, in the presence of an ethylene-α-olefin rubbery polymer selected from the group consisting of an ethylene-propylene copolymer and an ethylenepropylene-diene copolymer having a molecular weight distribution parameter Mw/Mn of 1.2–4.5, and wherein the ethylene-α-olefin rubber copolymer has a Mooney viscosity ($ML_{1+4}$, 100° C.) of 35 or less.

2. The rubber-modified thermoplastic resin composition according to claim 1, wherein the ethylene-α-olefin rubbery polymer has a molecular weight distribution parameter Mw/Mn of 1.5 to 4.0.

3. The rubber-modified thermoplastic resin composition according to claim 1, wherein the ethylene-α-olefin rubbery polymer has a Mooney viscosity ($ML_{1+4}$, 100° C.) of 10 to 35.

4. The rubber-modified thermoplastic r esin composition according to claim 1, wherein the ethylene-α-olefin rubbery polymer has a Mooney viscosity ($ML_{1+4}$, 100° C.) of 15 to 30.

5. The rubber-modified thermoplastic resin composition according to claim 1, wherein the ethylene-α-olefin rubbery polymer has an ethylene/α-olefin weight ratio of 60–90/40–10.

6. The rubber-modified thermoplastic resin composition according to claim 1, wherein the ethylene-α-olefin rubbery polymer has an ethylene/α-olefin weight ratio of 65–90/35–10.

7. The rubber-modified thermoplastic resin composition according to claim 1, wherein the ethylene-α-olefin rubbery polymer has an ethylene/α-olefin weight ratio of 70–88/30–12.

8. The rubber-modified thermoplastic resin composition according to claim 1, wherein the ethylenepropylene-diene copolymer has an iodine value of 4 to 40.

9. The rubber-modified thermoplastic resin composition according to claim 1, wherein the content of the rubber polymer is 5 to 45% by weight.

* * * * *